United States Patent
Iguchi et al.

(10) Patent No.: US 10,018,819 B2
(45) Date of Patent: Jul. 10, 2018

(54) LIGHT SHEET ILLUMINATION MICROSCOPE WHICH ILLUMINATES A SAMPLE FROM A DIRECTION SUBSTANTIALLY PERPENDICULAR TO A DETECTION AXIS, WHILE REDUCING LIKELIHOOD OF CREATING SHADOWS

(71) Applicant: OLYMPUS CORPORATION, Hachioji-shi, Tokyo (JP)

(72) Inventors: Yoshihito Iguchi, Tokyo (JP); Yu Kikuchi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 106 days.

(21) Appl. No.: 15/094,847

(22) Filed: Apr. 8, 2016

(65) Prior Publication Data
US 2016/0306154 A1  Oct. 20, 2016

(30) Foreign Application Priority Data
Apr. 15, 2015 (JP) .................................. 2015-082951

(51) Int. Cl.
*G02B 21/06* (2006.01)
*G02B 21/00* (2006.01)
(Continued)

(52) U.S. Cl.
CPC ......... *G02B 21/06* (2013.01); *G02B 21/0032* (2013.01); *G02B 21/0076* (2013.01); *G02B 21/16* (2013.01); *G02B 21/367* (2013.01)

(58) Field of Classification Search
CPC .. G02B 21/00; G02B 21/0004; G02B 21/002; G02B 21/0032; G02B 21/0048;
(Continued)

(56) References Cited

U.S. PATENT DOCUMENTS

| 7,554,725 B2 | 6/2009 | Stelzer et al. |
| 7,787,179 B2 * | 8/2010 | Lippert .................. G02B 21/06 359/385 |

(Continued)

FOREIGN PATENT DOCUMENTS

| DE | 102012015861 A1 | 4/2013 |
| DE | 102012218920 A1 | 4/2014 |

(Continued)

OTHER PUBLICATIONS

Extended European Search Report dated Aug. 10, 2016, issued in counterpart European Application No. 16164641.9.
(Continued)

*Primary Examiner* — Arnel C Lavarias
(74) *Attorney, Agent, or Firm* — Holtz, Holtz & Volek PC

(57) ABSTRACT

A light sheet illumination microscope includes an illumination optical system configured to illuminate a sample from a direction substantially perpendicular to an optical axis of a detection optical system. The illumination optical system includes a first optical element configured to convert light emitted from a light source into a light sheet that forms an illumination area having a sheet shape substantially perpendicular to the optical axis of the detection optical system when the sample is irradiated with the light sheet. The illumination optical system further includes a second optical element that configured to act on the light emitted from the light source such that the light sheet is converged, diverged or diffracted in a width direction of the light sheet.

9 Claims, 16 Drawing Sheets

(51) Int. Cl.
*G02B 21/16* (2006.01)
*G02B 21/36* (2006.01)

(58) Field of Classification Search
CPC .............. G02B 21/0052; G02B 21/006; G02B 21/0076; G02B 21/06; G02B 21/16
USPC ........ 359/362, 363, 368, 369, 385, 388, 434
See application file for complete search history.

(56) References Cited

U.S. PATENT DOCUMENTS

| | | |
|---|---|---|
| 8,970,950 B2 | 3/2015 | Stelzer |
| RE45,575 E * | 6/2015 | Lippert .................. G02B 21/06 |
| 9,134,521 B2 | 9/2015 | Huisken |
| 2009/0225413 A1 | 9/2009 | Stelzer et al. |
| 2011/0115895 A1 | 5/2011 | Huisken |
| 2012/0206798 A1 | 8/2012 | Knop et al. |
| 2014/0042339 A1 | 2/2014 | Stelzer et al. |
| 2014/0254005 A1 | 9/2014 | Lippert et al. |
| 2015/0309294 A1 | 10/2015 | Stelzer |
| 2016/0124201 A1* | 5/2016 | Kikuchi ............. G02B 21/0048 359/385 |
| 2016/0124203 A1* | 5/2016 | Ryu ....................... G02B 21/06 348/79 |

FOREIGN PATENT DOCUMENTS

| | | |
|---|---|---|
| EP | 2107408 A2 | 10/2009 |
| JP | 2008250303 A | 10/2008 |
| WO | 2010014244 A2 | 2/2010 |
| WO | 2012110488 A2 | 8/2012 |
| WO | 2014060271 A1 | 4/2014 |

OTHER PUBLICATIONS

Huisken, et al., "Even fluorescence excitation by multidirectional selective plane illumination microscopy (mSPIM)", Optics Letters, Optical Society of America, vol. 32, No. 17, Sep. 1, 2007, pp. 2608-2610.

Li, et al., "Selective plane illumination microscopy with structured illumination based on spatial light modulators", Progress in Biomedical Optics and Imaging, SPIE—International Society for Optical Engineering, vol. 8949, Mar. 12, 2014, pp. 89491S-1-89491S-5.

* cited by examiner

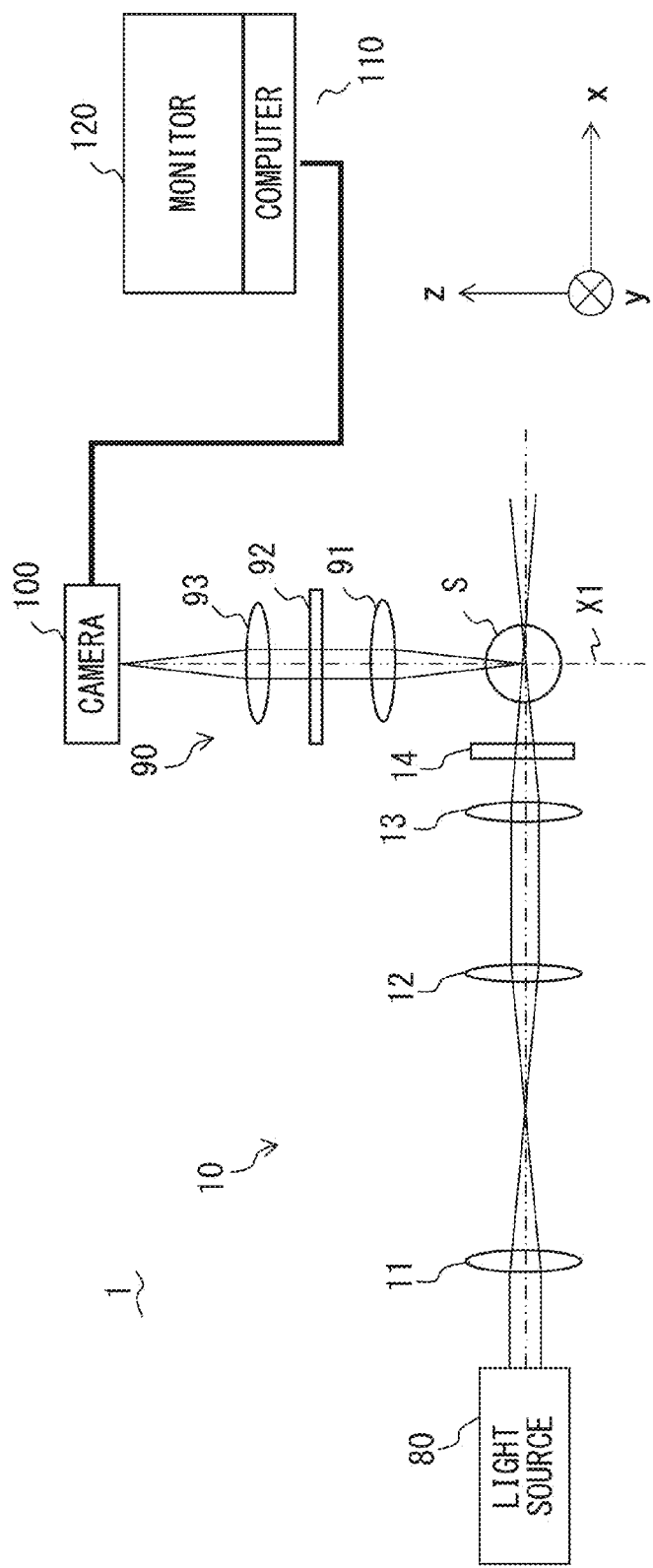
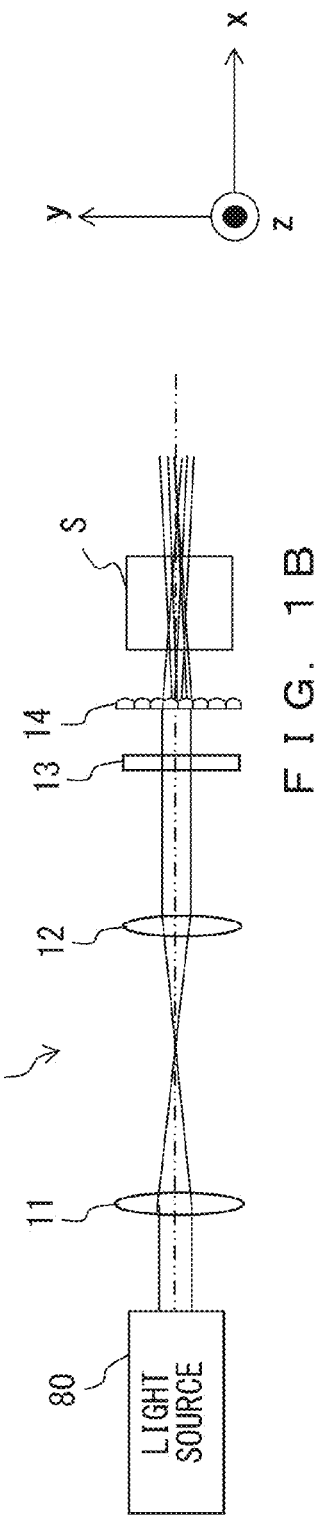
FIG. 1A
FIG. 1B

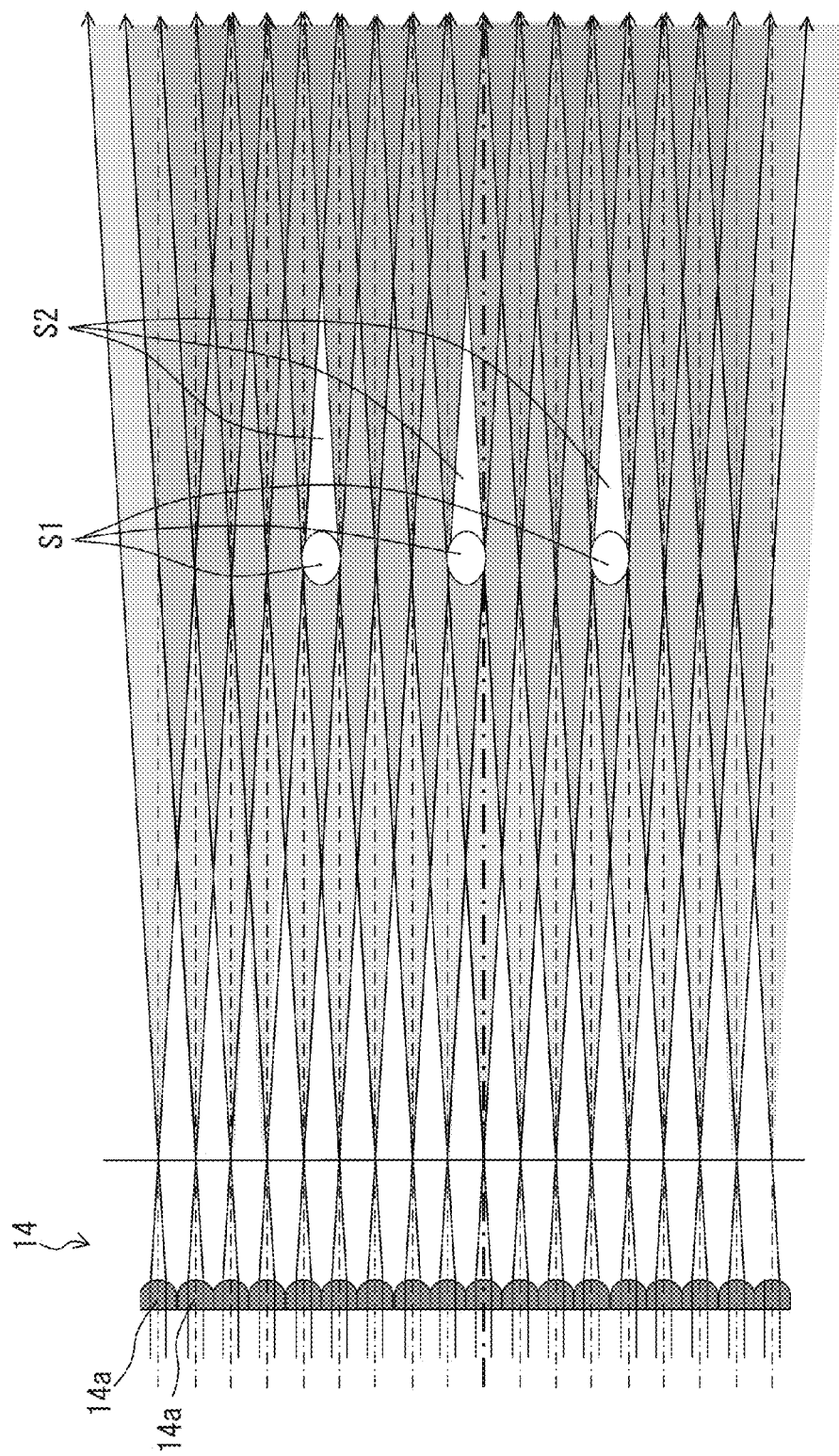
F I G. 3

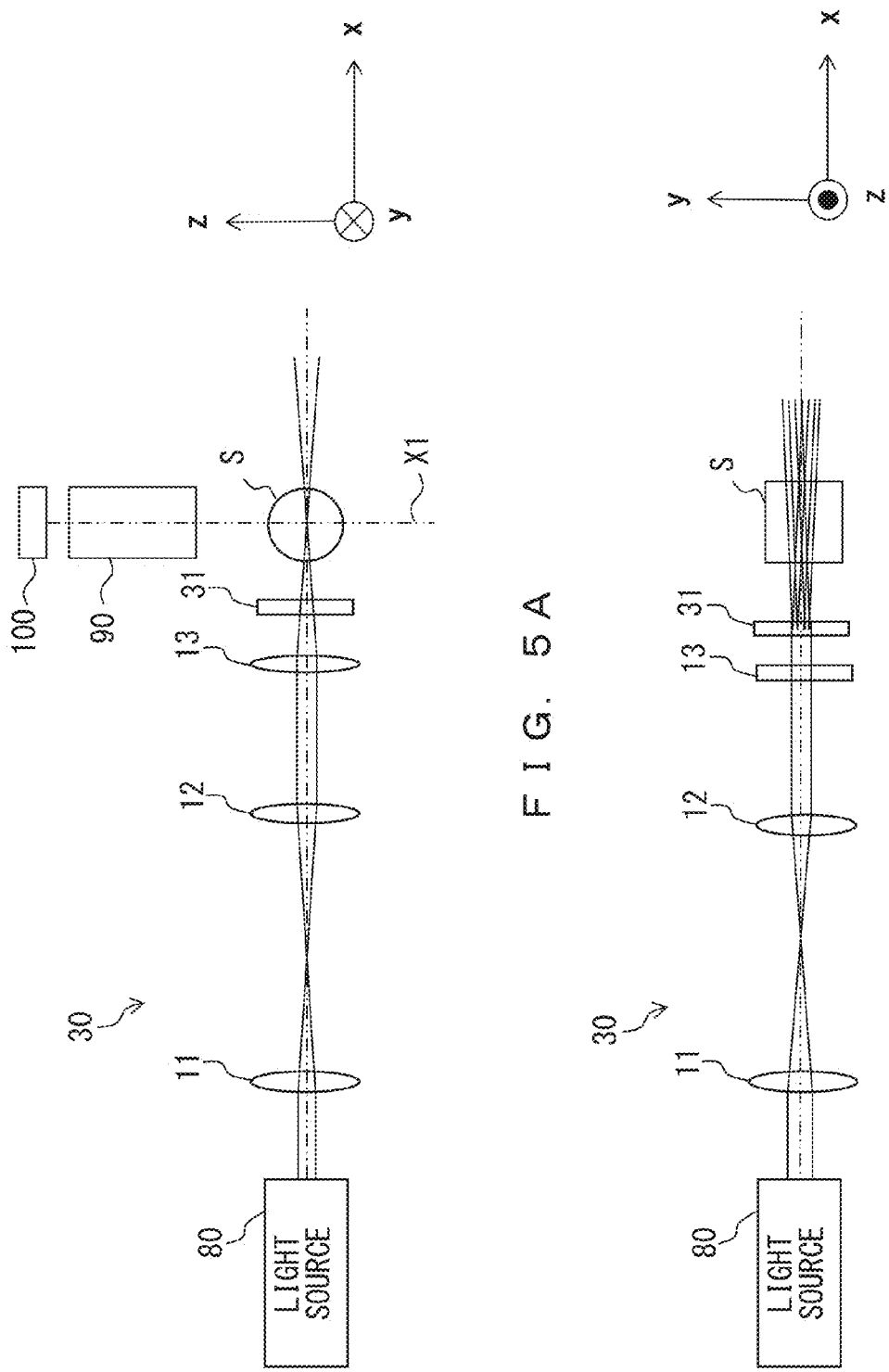

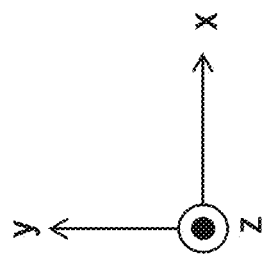
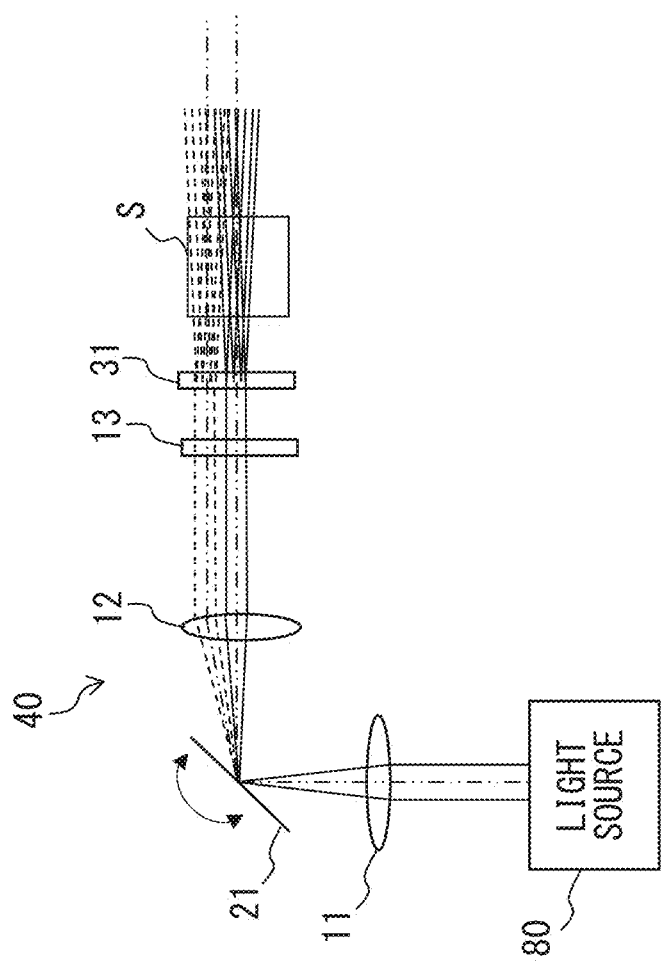
FIG. 8B

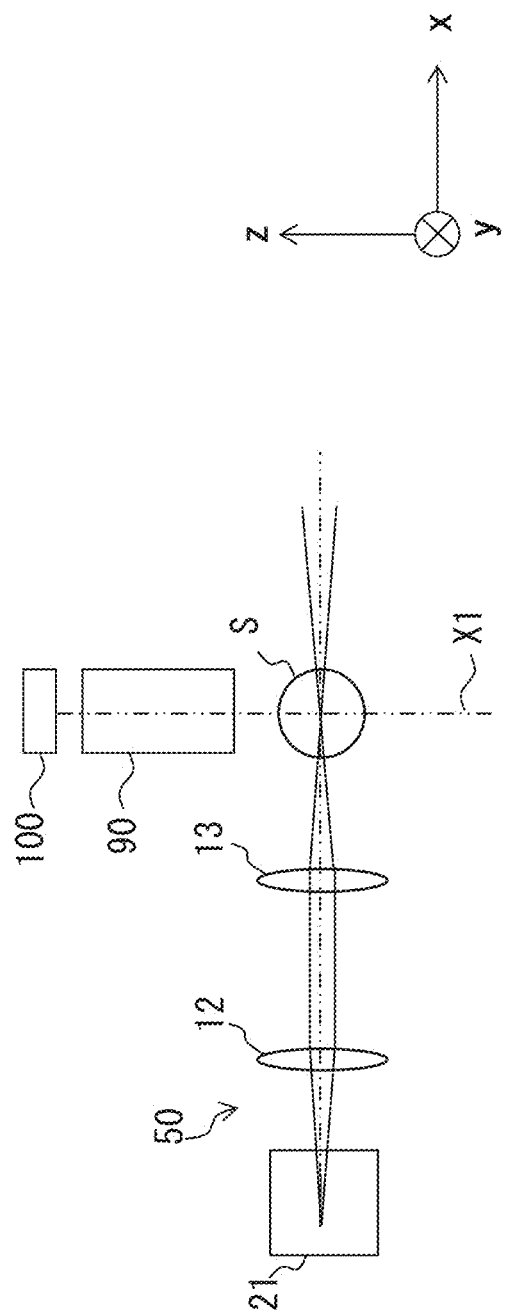
F I G. 9 A

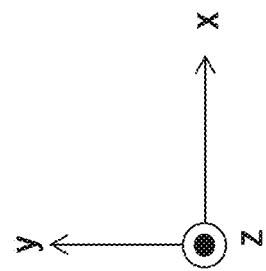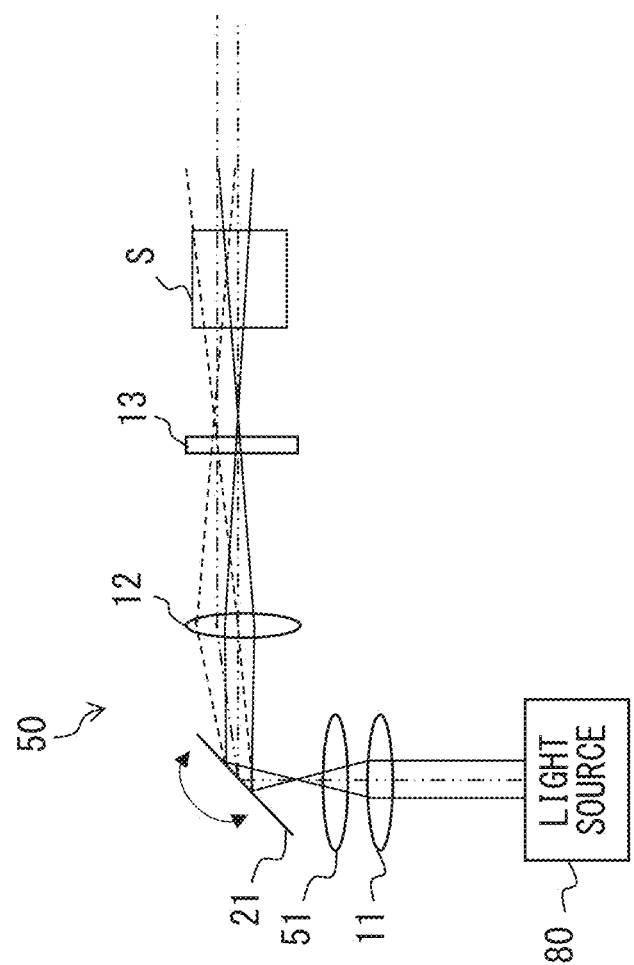
FIG. 9B

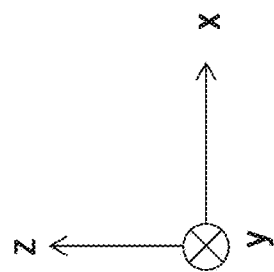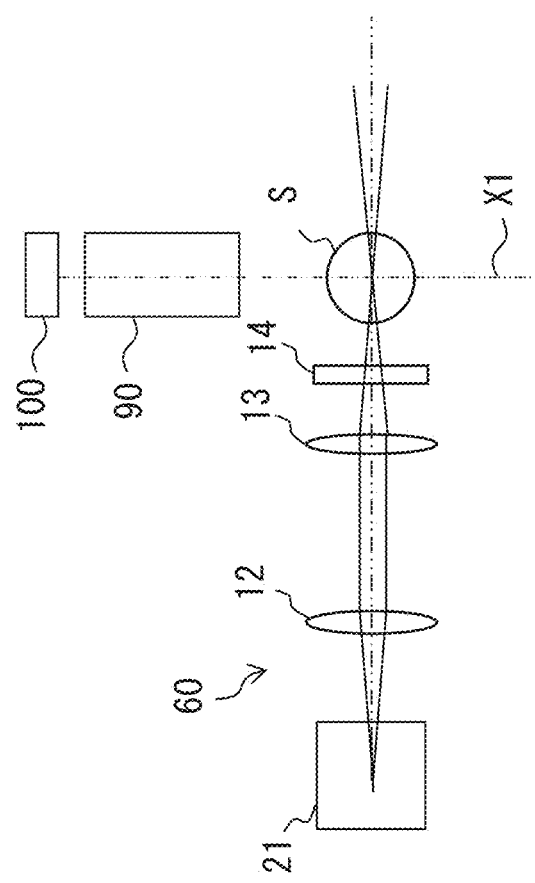
FIG. 10A

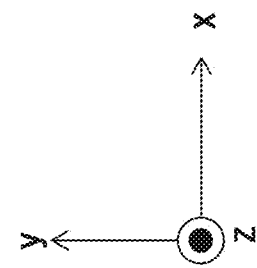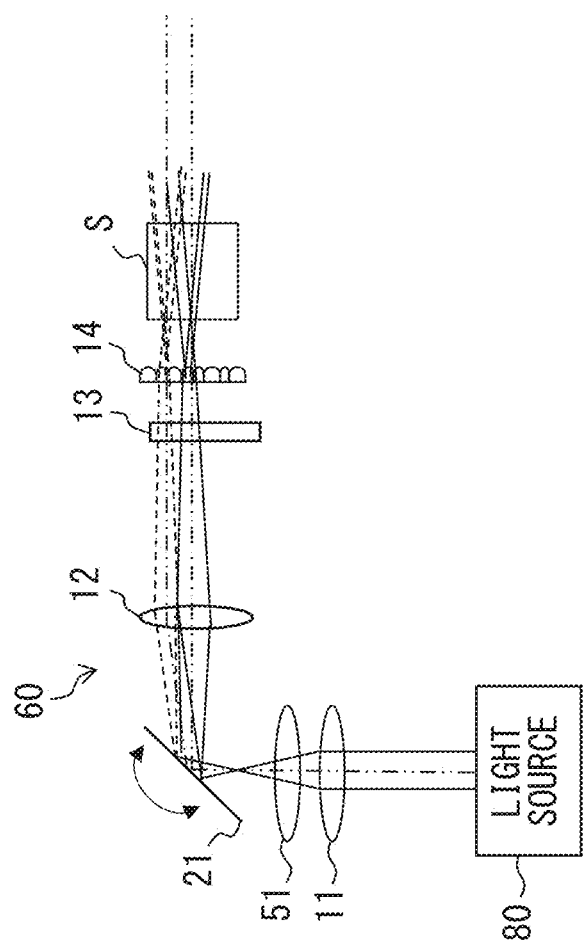
FIG. 10B

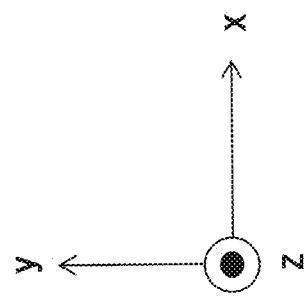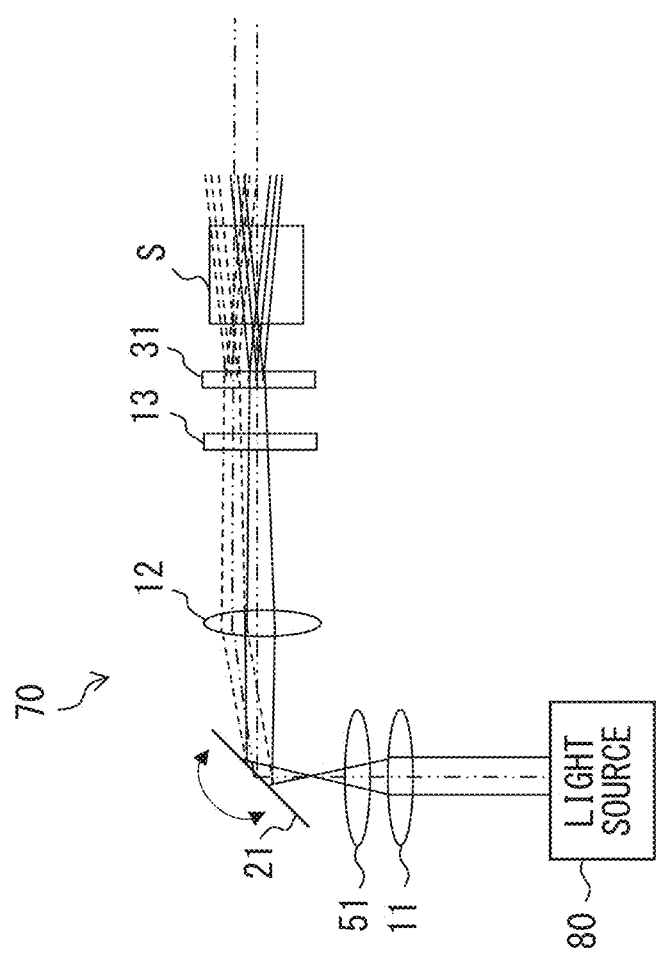
FIG. 11B

LIGHT SHEET ILLUMINATION MICROSCOPE WHICH ILLUMINATES A SAMPLE FROM A DIRECTION SUBSTANTIALLY PERPENDICULAR TO A DETECTION AXIS, WHILE REDUCING LIKELIHOOD OF CREATING SHADOWS

CROSS REFERENCE TO RELATED APPLICATIONS

This application is based upon and claims the benefit of priority from prior Japanese Patent Application No. 2015-082951, filed Apr. 15, 2015, the entire contents of which are incorporated herein by this reference.

BACKGROUND OF THE INVENTION

Field of the Invention

The present invention relates to a technology of a light sheet illumination microscope.

Description of the Related Art

In the field of fluorescence microscopy, a technology is known that irradiates a sample with a laser beam from a direction perpendicular to an optical axis of a detection optical system, so as to form, in the sample, a light sheet perpendicular to the optical axis of the detection optical system. This technology has been attracting attention in recent years because it provides the advantages of, for example, suppressing damage caused to a sample and realizing a high longitudinal resolution.

When the above-described technology is applied, a sample is illuminated from a direction different from a direction of the optical axis of the detection optical system, so, if the sample has a portion through which light cannot be easily transmitted due to absorption or a portion in which light is scattered, light will not enter behind that portion, and then a shadow will be created in the field of view.

A technology related to such a problem is disclosed, for example, in Japanese Laid-open Patent Publication No. 2008-250303. Japanese Laid-open Patent Publication No. 2008-250303 discloses a technology that irradiates a sample material with a radiation component of a sheet light at different angles according to the time by use of an oscillatory movement of a wobble plate or a swing mirror.

SUMMARY OF THE INVENTION

An aspect of the present invention provides a light sheet illumination microscope that includes an illumination optical system configured to illuminate a sample from a direction substantially perpendicular to an optical axis of a detection optical system, wherein the illumination optical system includes a first optical element configured to convert light emitted from a light source into a light sheet that forms an illumination area having a sheet shape substantially perpendicular to the optical axis of the detection optical system when the sample is irradiated with the light sheet, and a second optical element that acts on the light emitted from the light source such that the light sheet is converged or diverged in a width direction of the light sheet, and the illumination optical system is configured to cause the light sheet to enter the sample at a predetermined constant angle from different positions in the width direction.

Another aspect of the present invention provides a light sheet illumination microscope that includes an illumination optical system configured to illuminate a sample from a direction substantially perpendicular to an optical axis of a detection optical system, wherein the illumination optical system includes a first optical element configured to convert light emitted from a light source into a light sheet that forms an illumination area having a sheet shape substantially perpendicular to the optical axis of the detection optical system when the sample is irradiated with the light sheet, and a second optical element that has a plurality of optical element components aligned in a width direction and that acts on the light sheet such that the light sheet is converged, diverged, or diffracted in the width direction of the light sheet.

BRIEF DESCRIPTION OF THE DRAWINGS

The present invention will be more apparent from the following detailed description when the accompanying drawings are referenced.

FIGS. 1A and 1B illustrate a configuration of a light sheet illumination microscope 1 according to a first embodiment, in which FIG. 1A illustrates the configuration of the light sheet illumination microscope 1 as viewed from the side, and FIG. 1B illustrates the configuration of the light sheet illumination microscope 1 as viewed from above;

FIG. 3 illustrates a state of illumination performed on a sample S with a light sheet emitted from an illumination optical system 10;

FIGS. 4A and 4B illustrate a configuration of an illumination optical system 20 according to a second embodiment, in which FIG. 4A illustrates the configuration of the illumination optical system 20 as viewed from the side, and FIG. 4B illustrates the configuration of the illumination optical system 20 as viewed from above;

FIGS. 5A and 5B illustrate a configuration of an illumination optical system 30 according to a third embodiment, in which FIG. 5A illustrates the configuration of the illumination optical system 30 as viewed from the side, and FIG. 5B illustrates the configuration of the illumination optical system 30 as viewed from above;

FIGS. 8A and 8B illustrate a configuration of an illumination optical system 40 according to a fourth embodiment, in which FIG. 8A illustrates the configuration of the illumination optical system 40 as viewed from the side, and FIG. 8B illustrates the configuration of the illumination optical system 40 as viewed from above;

FIGS. 9A and 9B illustrate a configuration of an illumination optical system 50 according to a fifth embodiment, in which FIG. 9A illustrates the configuration of the illumination optical system 50 as viewed from the side, and FIG. 9B illustrates the configuration of the illumination optical system 50 as viewed from above;

FIGS. 10A and 10B illustrate a configuration of an illumination optical system 60 according to a sixth embodiment, in which FIG. 10A illustrates the configuration of the illumination optical system 60 as viewed from the side, and FIG. 10B illustrates the configuration of the illumination optical system 60 as viewed from above; and FIGS. 11A and 11B illustrate a configuration of an illumination optical system 70 according to a seventh embodiment, in which FIG. 11A illustrates the configuration of the illumination optical system 70 as viewed from the side, and FIG. 11B illustrates the configuration of the illumination optical system 70 as viewed from above.

DESCRIPTION OF THE EMBODIMENTS

When the technology disclosed in Japanese Laid-open Patent Publication No. 2008-250303 is applied, an area that is not allowed to be irradiated with a radiation component at a certain angle due to the prevention of a portion through which light is not transmitted may also be irradiated with a radiation component at another angle. Thus, an area that is not allowed to be irradiated with light can be made smaller, which permits a shadow to be less likely to be created. However, it is difficult to illuminate an illumination range uniformly because the illumination angle varies.

Hereinafter, the examples of the present invention will be explained.

First Embodiment

Figure 2:
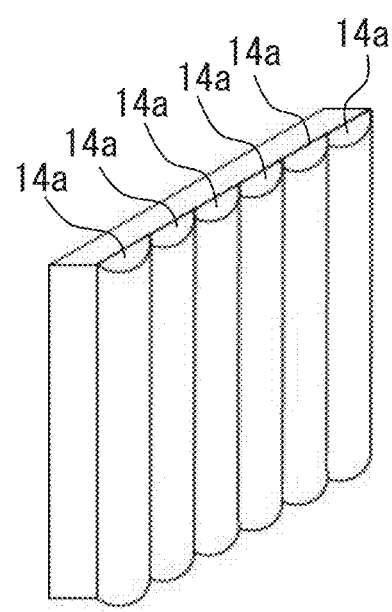
FIG. 2 is a perspective view of a cylindrical lens array 14 that is included in the light sheet illumination microscope 1.

FIGS. 1A and 1B illustrate a configuration of a light sheet illumination microscope 1 according to the present embodiment. FIG. 1A illustrates the configuration of the light sheet illumination microscope 1 as viewed from the side. FIG. 1B illustrates the configuration of the light sheet illumination microscope 1 as viewed from above. The light sheet illumination microscope 1 is, for example, a fluorescence microscope that detects fluorescence from a sample S that is a biological specimen. The light sheet illumination microscope 1 includes an illumination optical system 10, a light source 80, a detection optical system 90, a camera 100, a computer 110, and a monitor 120. However, in FIG. 1B, the detection optical system 90, the camera 100, the computer 110, and the monitor 120 are omitted. Further, an x-y-z coordinate system illustrated in FIGS. 1A and 1B is an orthogonal coordinate system that is defined for convenience to refer to directions herein. FIG. 2 is a perspective view of a cylindrical lens array 14 that is included in the light sheet illumination microscope 1. FIG. 3 illustrates a state of illumination performed on the sample S with a light sheet emitted from the illumination optical system 10.

The light sheet illumination microscope 1 irradiates the sample S with illumination light that forms an illumination area having sheet shape that is substantially perpendicular to an optical axis X1 of the detection optical system 90 (hereinafter referred to as a light sheet). Here, the sheet shape refers to a shape in which a section perpendicular to a longitudinal direction (an optical-axis direction on the exit side of the illumination optical system 10, that is, a direction in which light travels) has a two-dimensional shape that has two directions perpendicular to each other, wherein one of the two directions is long and the other is short. The long direction in the section is hereinafter referred to as a width direction of a light sheet, and the short direction as a thickness direction of the light sheet. Further, the sheet shape substantially perpendicular to the optical axis X1 of the detection optical system 90 refers to a sheet shape in which a light sheet surface that is defined by the longitudinal direction and the width direction is substantially perpendicular to the optical axis X1 of the detection optical system 90. In the present embodiment, it refers to a sheet shape in which the longitudinal direction is an x-axis direction, the width direction is a y-axis direction, and the thickness direction is a z-axis direction.

The illumination optical system 10 is an optical system that illuminates the sample S from the direction substantially perpendicular to the optical axis X1 of the detection optical system 90. The illumination optical system 10 includes, in order from the side of the light source 80, a lens 11, a lens 12, a cylindrical lens 13, and the cylindrical lens array 14.

The light source 80 is a light source that emits illumination light, and that is, for example, a laser light source. The detection optical system 90 is an optical system that collects light (for example, fluorescence) from the sample S and forms an optical image of the sample S on a light-receiving surface of an image sensor of the camera 100. The detection optical system 90 includes, in order from the side of the sample S, an objective 91, a wavelength selective element 92, and a tube lens 93. The wavelength selective element 92 is, for example, a barrier filter for preventing illumination light from entering the camera 100.

The camera 100 is an imaging device that includes a two-dimensional image sensor such as a CCD or a CMOS. The camera 100 detects light that enters through the detection optical system 90, so as to capture an image of the sample S. The computer 110 is a control device that controls the light sheet illumination microscope 1. For example, the computer 110 controls an exposure time of the camera 100 and a display of the monitor 120. The monitor 120 displays an image of the sample S captured by the camera 100.

In the illumination optical system 10, first, illumination light that has emitted from the light source 80 enters the lens 11 and the lens 12 and is converted into a collimated beam (also referred to as collimated light flux) that has a desired beam diameter. The beam diameter of the collimated beam is a width of a light sheet with which the sample S is irradiated, so the lens 11 and the lens 12 are means for determining the width of a light sheet.

The illumination light converted into a collimated beam then enters the cylindrical lens 13. The cylindrical lens 13 is arranged to have a refractive power in an x-z plane and not to have a refractive power in an x-y plane. Thus, as illustrated in FIGS. 1A and 1B, while converging the illumination light in the x-z plane, the cylindrical lens 13 maintains, in the x-y plane, the beam diameter of the illumination light without substantially acting on the illumination light. Accordingly, the illumination light is converted into a light sheet. In other words, the cylindrical lens 13 is an optical element (first optical element) that converts illumination light emitted from a light source into a light sheet. As described below, the light sheet forms an illumination area having a sheet shape substantially perpendicular to the optical axis X1 of the detection optical system 90 when the sample S is irradiated with the light sheet. A thickness of a light sheet with which the sample S is irradiated is dependent on a numerical aperture on the exit side of the illumination optical system 10. Thus, the lens 11, the lens 12, and the cylindrical lens 13 are means for determining a thickness of a light sheet.

The illumination light converted by the cylindrical lens 13 into a light sheet enters the cylindrical lens array 14. As illustrated in FIG. 2, the cylindrical lens array 14 is an optical element array that has a plurality of optical element components 14a. The plurality of optical element components 14a are aligned in a y-direction (that is, in the width direction of the light sheet). Each of the optical element components 14a is a cylindrical lens that has an optical axis parallel with an x-axis, and that has a refractive power in the x-y plane and does not have a refractive power in the x-z plane. For this reason, as illustrated in FIG. 1A, in the x-z plane, the cylindrical lens array 14 transmits the light sheet without substantially acting on the light sheet. On the other hand, as illustrated in FIG. 1B, in the x-y plane, the cylindrical lens array 14 divides the incident light sheet into a plurality of light sheets that are aligned in the width direction and of which the number is the same as that of the optical element components 14a which the light sheet has entered. Further, each of the plurality of light sheets is converged by a corresponding optical element component 14a in the width direction of the light sheet. Accordingly, the plurality of light sheets that are formed by the cylindrical lens array 14 and aligned in the width direction enter the sample S at a predetermined constant angle from different positions in the width direction. In other words, the cylindrical lens array 14 is an optical element (second optical element) that acts on illumination light so that a light sheet is divided into a plurality of light sheets aligned in the width direction. Further, the cylindrical lens array 14 is an optical element (second optical element) that acts on illumination light so that each of the light sheets is converged in the width direction of the light sheet.

In the light sheet illumination microscope 1 having the above-described configuration, as illustrated in FIG. 3, each of a plurality of light sheets that have been emitted from the illumination optical system 10 is first focused in the x-y plane, and then enters the sample S while diverging in the width direction. Accordingly, even when there exists, for example, a scatterer S1 on the sample S, a light sheet (to be exact, a subordinate ray that configures the light sheet) is able to enter the area behind the scatterer S1. This results in making a shadow S2 that is created behind the scatterer S1 smaller. Further, the plurality of light sheets that enter the sample S while diverging have a relationship in which they are in a position moved toward one another parallel to the width direction, and enter the sample S at the same angle. Thus, the plurality of light sheets overlap similarly in an illumination range, which permits an illumination of the illumination range with a uniform illumination intensity. Therefore, according to the light sheet illumination microscope 1, it is possible to realize a light sheet illumination in which a shadow is less likely to be created while uniformly illuminating within an illumination range.

In the present embodiment, the cylindrical lens array 14 has a convex lens shape in the x-y plane. However, the cylindrical lens array 14 is not limited to collecting light, but it may convert a collimated beam into converged or diverged non-collimated beams. For example, it may be a cylindrical lens array having a concave lens shape in the x-y plane, and light is diverged directly from this cylindrical lens array.

Second Embodiment

Figure 4A:
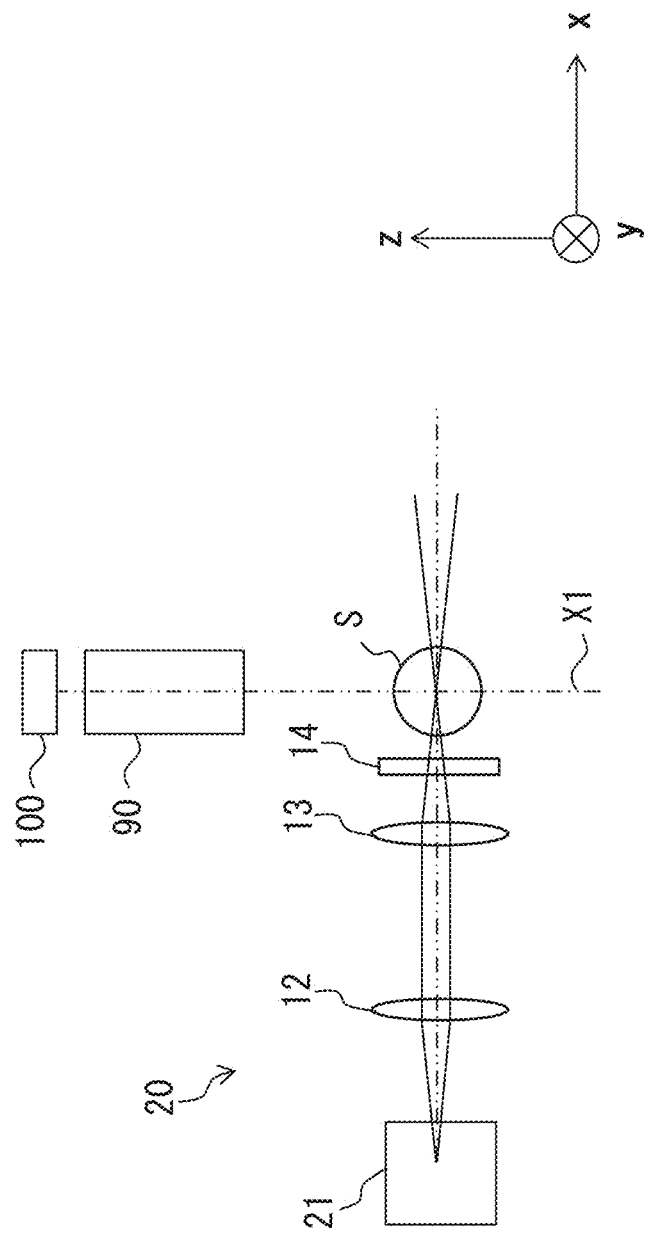
Figure 4B:
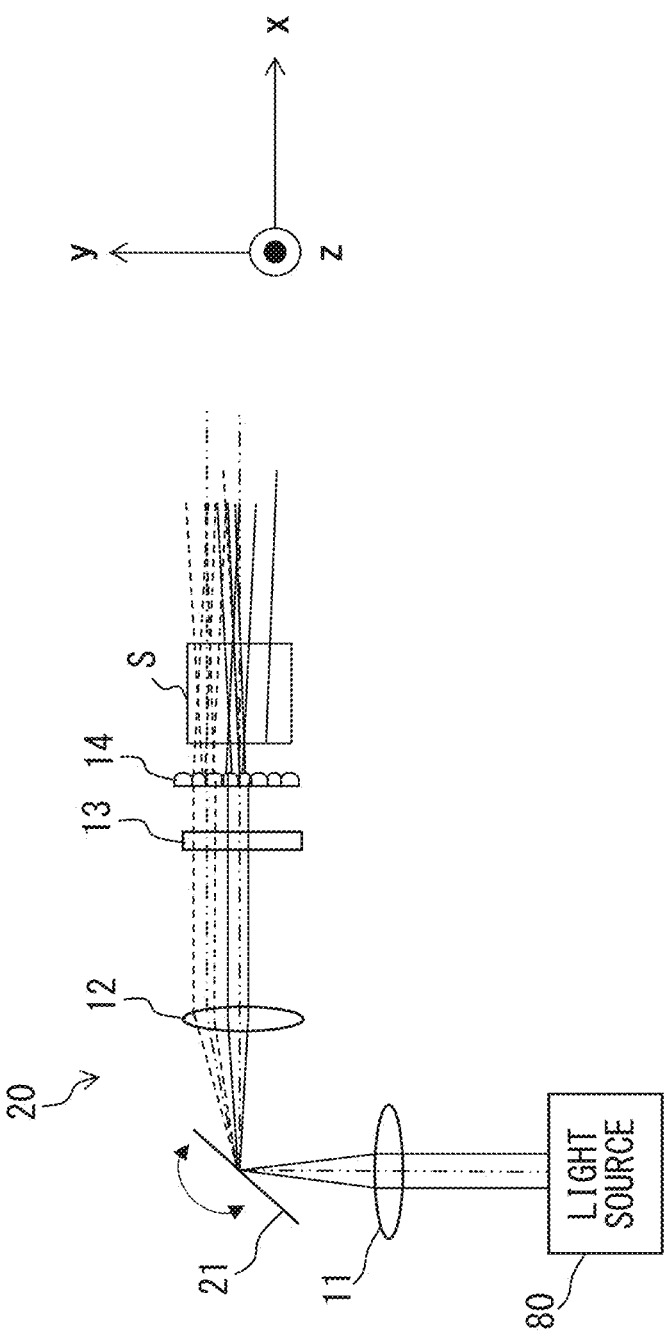

FIGS. 4A and 4B illustrate a configuration of an illumination optical system 20 according to the present embodiment. FIG. 4A illustrates the configuration of the illumination optical system 20 as viewed from the side. FIG. 4B illustrates the configuration of the illumination optical system 20 as viewed from above. FIG. 4A also describes the detection optical system 90 and the camera 100 in addition to the illumination optical system 20. FIG. 4B also describes the light source 80 in addition to the illumination optical system 20. A light sheet illumination microscope according to the present embodiment is similar to the light sheet illumination microscope 1 except for including the illumination optical system 20 instead of the illumination optical system 10.

The illumination optical system 20 is different from the illumination optical system 10 in that it includes a galvanometer mirror 21 between the lens 11 and the lens 12. The galvanometer mirror 21 is a scanner for scanning the sample S in the width direction with a plurality of light sheets formed by the cylindrical lens array 14. The galvanometer mirror 21 is arranged in a position in which light emitted from the light source 80 is focused. Further, the position in which the galvanometer mirror 21 is arranged is also a front focal position of the lens 12. The galvanometer mirror 21 is a rotatable mirror that has a deflection surface that deflects light. In the galvanometer mirror 21, the position substantially identical to where a rotation axis of the mirror is positioned is the front focal position of the lens 12. The direction in which light deflected by the galvanometer mirror 21 travels varies by changing the angle of the deflection surface.

In the illumination optical system 20, the galvanometer mirror 21 deflects illumination light collected by the lens 11 into a spot on the galvanometer mirror 21. FIG. 4B illustrates the illumination light (solid lines and broken lines) deflected in different directions by the rotation of the galvanometer mirror 21. As illustrated in FIG. 4B, regardless of a direction of deflection, the illumination light deflected by the galvanometer mirror 21 is converted by the lens 12 that functions as a collector lens into a collimated beam parallel with an optical axis of the illumination optical system 20. After that, as is the case with the illumination optical system 10, a plurality of light sheets aligned in the width direction are formed by the cylindrical lens 13 and the cylindrical lens array 14. Those light sheets enter the sample S from different positions in the width direction.

The camera 100 detects light from the sample S that enters through the detection optical system 90 and captures an image of the sample S. Here, an exposure time of the camera 100 is controlled for a period of time for which the galvanometer mirror 21 rotates and a light sheet passes through an observation portion of the sample S at least once.

According to the light sheet illumination microscope having the above-described configuration according to the present embodiment, it is possible to realize a light sheet illumination in which a shadow is less likely to be created while uniformly illuminating within an illumination range, as is the case with the light sheet illumination microscope 1. Further, in the light sheet illumination microscope according to the present embodiment, it is possible to move, in a width direction of a light sheet, the entirety of the illumination range that is illuminated by the light sheet by having the galvanometer mirror 21 move a collimated beam emitted from the lens 12 in the width direction. This permits a wider range of illumination.

Third Embodiment

Figure 6:
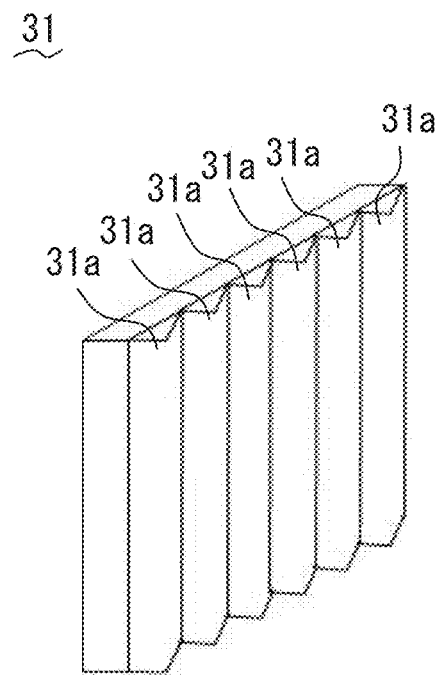
FIG. 6 is a perspective view of a diffractive optical element 31 that is included in an illumination optical system 30.
Figure 7:
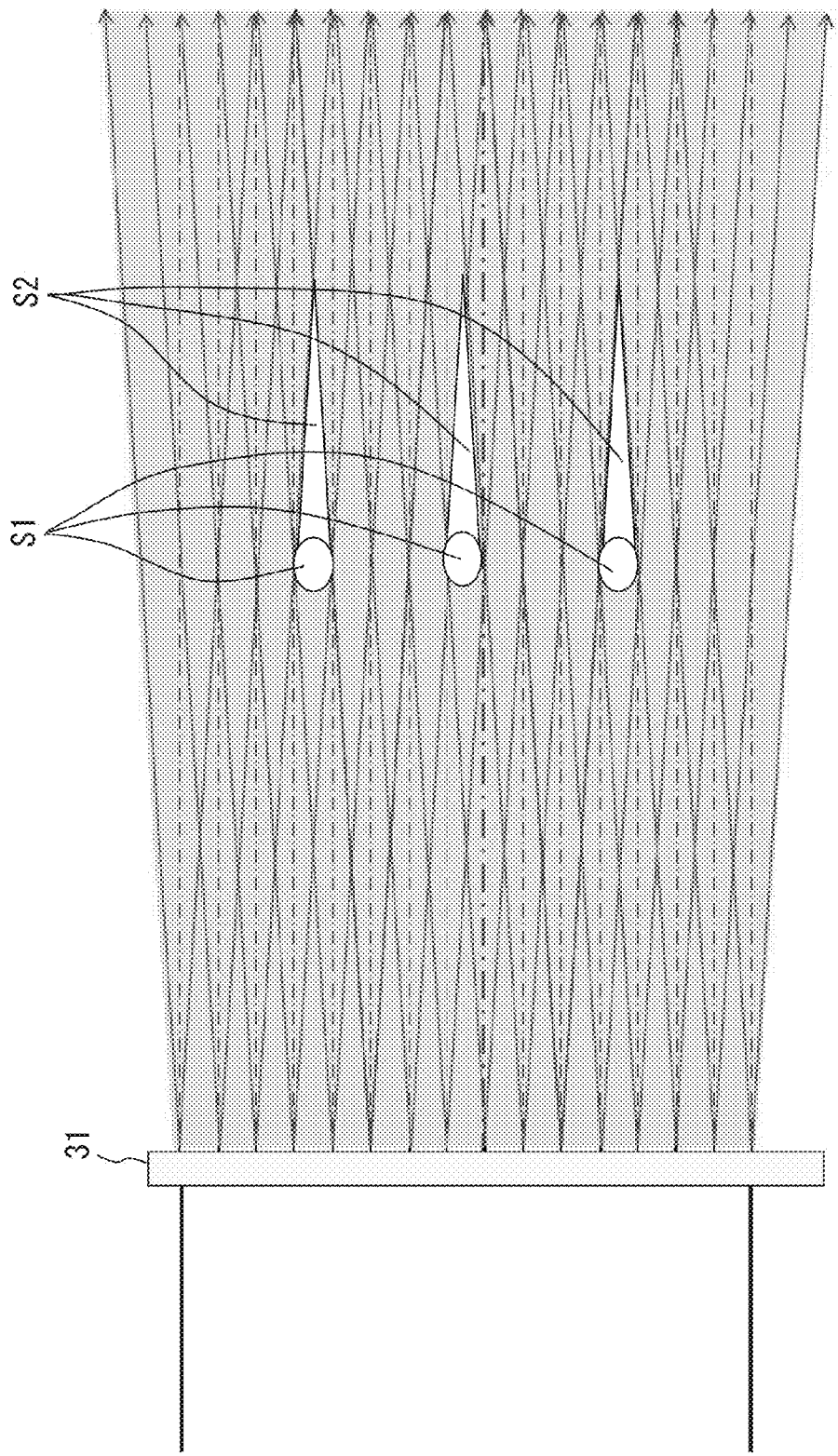
FIG. 7 illustrates a state of illumination performed on the sample S with a light sheet emitted from the illumination optical system 30.

FIGS. 5A and 5B illustrate a configuration of an illumination optical system 30 according to the present embodiment. FIG. 5A illustrates the configuration of the illumination optical system 30 as viewed from the side. FIG. 5B illustrates the configuration of the illumination optical system 30 as viewed from above. FIG. 5A also describes the light source 80, the detection optical system 90, and the camera 100 in addition to the illumination optical system 30. FIG. 5B also describes the light source 80 in addition to the illumination optical system 30. A light sheet illumination microscope according to the present embodiment is similar to the light sheet illumination microscope 1 except for including the illumination optical system 30 instead of the illumination optical system 10. FIG. 6 is a perspective view of a diffractive optical element 31 that is included in the illumination optical system 30. FIG. 7 illustrates a state of illumination performed on the sample S with a light sheet emitted from the illumination optical system 30.

The illumination optical system 30 is different from the illumination optical system 10 in that it includes the diffractive optical element 31 instead of the cylindrical lens array 14. As illustrated in FIG. 6, the diffractive optical element 31 is an optical element array that has a plurality of diffractive optical elements 31a. The plurality of diffractive optical elements 31a are aligned in the y-direction (that is, in the width direction of the light sheet).

The diffractive optical element 31 acts on illumination light such that a light sheet is diffracted in the width direction of the light sheet. As a result, as illustrated in FIG. 7, the sample S is irradiated with the light sheets that travels in a plurality of specific directions (in two directions in FIG. 7). Accordingly, even when there exists a scatterer S1 on the sample S, the light sheet is able to enter the area behind the scatterer S1. Further, pieces of diffracted light that travel in the plurality of specific directions overlap, which results in illuminating, with a uniform illumination intensity, an illumination range in which the pieces of diffracted light overlap. Therefore, according to the light sheet illumination microscope according to the present embodiment, it is possible to realize a light sheet illumination in which a shadow is less likely to be created while uniformly illuminating within an illumination range, as is the case with the light sheet illumination microscope 1.

Fourth Embodiment

Figure 8A:
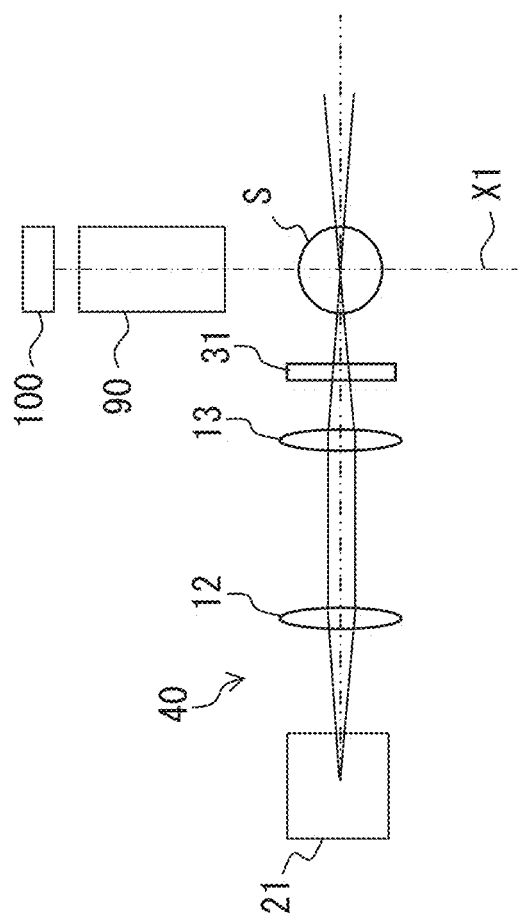

FIGS. 8A and 8B illustrate a configuration of an illumination optical system 40 according to the present embodiment. FIG. 8A illustrates the configuration of the illumination optical system 40 as viewed from the side. FIG. 8B illustrates the configuration of the illumination optical system 40 as viewed from above. FIG. 8A also describes the detection optical system 90 and the camera 100 in addition to the illumination optical system 40. FIG. 8B also describes the light source 80 in addition to the illumination optical system 40. A light sheet illumination microscope according to the present embodiment is similar to the light sheet illumination microscope according to the third embodiment except for including the illumination optical system 40 instead of the illumination optical system 30.

The illumination optical system 40 is different from the illumination optical system 30 in that it includes the galvanometer mirror 21 between the lens 11 and the lens 12. The galvanometer mirror 21 is a scanner for scanning the sample S in the width direction with a plurality of light sheets formed by the diffractive optical element 31. The galvanometer mirror 21 is arranged in a position in which light emitted from the light source 80 is focused. Further, the position in which the galvanometer mirror 21 is arranged is also a front focal position of the lens 12. The galvanometer mirror 21 is similar to the galvanometer mirror 21 according to the second embodiment and acts in a similar way.

According to the light sheet illumination microscope according to the present embodiment, it is possible to realize a light sheet illumination in which a shadow is less likely to be created while uniformly illuminating within an illumination range, as is the case with the light sheet illumination microscope 1. Further, as is the case with the light sheet illumination microscope according to the second embodiment, it is possible to move, in a width direction of a light sheet, the entirety of the illumination range that is illuminated by the light sheet by having the galvanometer mirror 21 move a collimated beam emitted from the lens 12 in the width direction. This permits a wider range of illumination.

Fifth Embodiment

FIGS. 9A and 9B illustrate a configuration of an illumination optical system 50 according to the present embodiment. FIG. 9A illustrates the configuration of the illumination optical system 50 as viewed from the side. FIG. 9B illustrates the configuration of the illumination optical system 50 as viewed from above. FIG. 9A also describes the detection optical system 90 and the camera 100 in addition to the illumination optical system 50. FIG. 9B also describes the light source 80 in addition to the illumination optical system 50. A light sheet illumination microscope according to the present embodiment is similar to the light sheet illumination microscope according to the second embodiment except for including the illumination optical system 50 instead of the illumination optical system 20.

The illumination optical system 50 is different from the illumination optical system 20 in that it includes a cylindrical lens 51 between the lens 11 and the galvanometer mirror 21 instead of the cylindrical lens array 14.

The cylindrical lens 51 (second optical element) is arranged to have a refractive power in the x-y plane and not to have a refractive power in a y-z plane. Thus, illumination light converted by the lens 11 into convergent light is further converged by the cylindrical lens 51. Then, the light is collected prior to the galvanometer mirror 21, and enters the galvanometer mirror 21 while spreading out in an x-direction (in a direction perpendicular to a z-direction). On the other hand, in the y-z plane, the cylindrical lens 51 does not substantially act on the illumination light. As a result, as illustrated in FIG. 9A, the illumination light is collected into a line perpendicular to the z-direction on the deflection surface of the galvanometer mirror 21.

In the illumination optical system 50, the galvanometer mirror 21 deflects the illumination light collected by the cylindrical lens 51 into a line on the deflection surface of the galvanometer mirror 21. FIG. 9B illustrates the illumination light (solid lines and broken lines) deflected in different directions by the rotation of the galvanometer mirror 21. As illustrated in FIG. 9B, regardless of a direction of deflection, the illumination light deflected by the galvanometer mirror 21 is converted by the lens 12 that functions as a collector lens into a beam having a principal ray parallel with an optical axis of the illumination optical system 50. As illustrated in FIGS. 9A and 9B, the illumination light emitted from the lens 12 (that is, the beam having a principal ray parallel with the optical axis) is a collimated beam in the x-z plane and is a convergent beam in the x-y plane.

The illumination light emitted from the lens 12 then enters the cylindrical lens 13. The cylindrical lens 13 is arranged to have a refractive power in the x-z plane and not to have a refractive power in the x-y plane. While converging the illumination light in the x-z plane as illustrated in FIG. 9A, the cylindrical lens 13 does not substantially act on the illumination light in the x-y plane as illustrated in FIG. 9B. As a result, the illumination light is converted by the cylindrical lens 13 into a light sheet. The light sheet is first focused in the width direction prior to the sample S and then irradiated onto the sample S while diverging in the width direction.

Thus, in the light sheet illumination microscope according to the present embodiment, even when there exists a scatterer S1 on the sample S, a light sheet (to be exact, a subordinate ray that configures the light sheet) is able to enter the area behind the scatterer S1. This results in making a shadow S2 that is created behind the scatterer S1 smaller. Further, the light sheet is moved parallel to the width direction by the rotation of the galvanometer mirror 21, which permits the light sheet to enter the sample S at the same angle from different positions in the width direction. This achieves the uniformity in illumination intensity in an illumination range, the illumination intensity being calculated by integration for a prescribed period of time such as an exposure time. Therefore, according to the light sheet illumination according to the present embodiment, it is possible to realize a light sheet illumination in which a shadow is less likely to be created while uniformly illuminating within an illumination range.

Sixth Embodiment

FIGS. 10A and 10B illustrate a configuration of an illumination optical system 60 according to the present embodiment. FIG. 10A illustrates the configuration of the illumination optical system 60 as viewed from the side. FIG. 10B illustrates the configuration of the illumination optical system 60 as viewed from above. FIG. 10A also describes the detection optical system 90 and the camera 100 in addition to the illumination optical system 60. FIG. 10B also describes the light source 80 in addition to the illumination optical system 60. A light sheet illumination microscope according to the present embodiment is similar to the light sheet illumination microscope according to the fifth embodiment except for including the illumination optical system 60 instead of the illumination optical system 50.

The illumination optical system 60 is different from the illumination optical system 50 in that it includes the cylindrical lens array 14 between the cylindrical lens 13 and the sample S. The arrangement of the cylindrical lens array 14 is similar to that of the cylindrical lens array 14 according to the first embodiment.

According to the light sheet illumination microscope according to the present embodiment, it is possible to realize a light sheet illumination in which a shadow is less likely to be created while uniformly illuminating within an illumination range, as is the case with the light sheet illumination microscope according to the fifth embodiment. Further, a light sheet is diverged more strongly in the width direction due to the action of the cylindrical lens array 14, which achieves a light sheet illumination in which a shadow is even less likely to be created, compared with the light sheet illumination microscope according to the fifth embodiment.

Seventh Embodiment

Figure 11A:
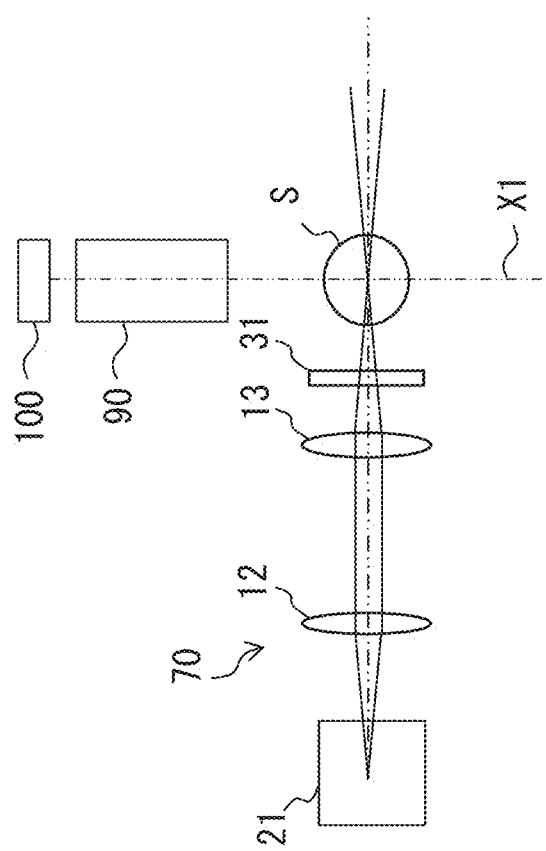

FIGS. 11A and 11B illustrate a configuration of an illumination optical system 70 according to the present embodiment. FIG. 11A illustrates the configuration of the illumination optical system 70 as viewed from the side. FIG. 11B illustrates the configuration of the illumination optical system 70 as viewed from above. FIG. 11A also describes the detection optical system 90 and the camera 100 in addition to the illumination optical system 70. FIG. 11B also describes the light source 80 in addition to the illumination optical system 70. A light sheet illumination microscope according to the present embodiment is similar to the light sheet illumination microscope according to the sixth embodiment except for including the illumination optical system 70 instead of the illumination optical system 60.

The illumination optical system 70 is different from the illumination optical system 60 in that it includes the diffractive optical element 31 instead of the cylindrical lens array 14. The arrangement of the diffractive optical element 31 is similar to that of the diffractive optical element 31 according to the third embodiment.

The light sheet illumination microscope according to the present embodiment, too, permits providing of an advantage similar to that provided by the light sheet illumination microscope according to the sixth embodiment.

The embodiments described above are just examples to facilitate understanding of the present invention, and the invention is not limited to these embodiments. Various modifications and alterations may be made to a light sheet illumination microscope without departing from the invention specified in the claims. A combination of some of the features in the embodiments described herein may be provided as a single embodiment.

The above-described embodiments describe an example of suppressing a creation of a shadow by causing light to enter behind a material, in a sample, through which light is not transmitted. However, a creation of a shadow may be suppressed by eliminating the material itself through which light is not transmitted. In particular, when the material through which light is not transmitted is a scatterer such as an air bubble, a light sheet illumination microscope may include a removal mechanism such as an ultrasonic vibration device that ultrasonically vibrates a sample S or a reduction device that reduces the atmosphere surrounding the sample S.

In each of the embodiments, alight sheet illumination microscope is assumed to be an upright microscope. Thus, it has been described that the figure with a number to which A is added illustrates a configuration of the light sheet illumination microscope as viewed from the side, and that the figure with a number to which B is added illustrates the configuration of the light sheet illumination microscope as viewed from above. However, the light sheet illumination microscope is not limited to an upright microscope, but it may be an inverted microscope. Further, the light sheet illumination microscope may be a microscope in which an optical axis X1 of a detection optical system and an optical axis of an illumination optical system are both horizontal. Thus, it may be described that, from among the figures of each of the embodiments, the figure with a number to which A is added illustrates the configuration of the light sheet illumination microscope as viewed from a direction perpendicular to both the optical axis X1 of the detection optical system and the optical axis on the exit side of the illumination optical system. It may be described that, from among the figures of each of the embodiments, the figure with a number to which B is added illustrates the configuration of the light sheet illumination microscope as viewed from the side of a camera located in a direction of the optical axis X1 of the detection optical system. Further, the cylindrical lens array 14 and the diffractive optical element 31 that are arranged prior to the sample S may be provided to a container for containing the sample S. Furthermore, the container itself may be provided with the cylindrical lens array 14 and the diffractive optical element 31.

What is claimed is:

1. A light sheet illumination microscope comprising an illumination optical system configured to illuminate a sample from a direction substantially perpendicular to an optical axis of a detection optical system, wherein
the illumination optical system includes
a first optical element configured to convert light emitted from a light source into a light sheet that forms an illumination area having a sheet shape substantially perpendicular to the optical axis of the detection optical system when the sample is irradiated with the light sheet, and a second optical element configured to act on the light emitted from the light source such that the light sheet is converged or diverged in a width direction of the light sheet and the illumination optical system is configured to cause the light sheet to enter the sample at a predetermined constant angle from different positions in the width direction.

2. The light sheet illumination microscope according to claim 1, wherein the second optical element is an optical element array that has a plurality of optical element components that are aligned in the width direction, and the illumination optical system is configured to irradiate the sample with a plurality of light sheets that are formed by the optical element array.

3. The light sheet illumination microscope according to claim 2, wherein the illumination optical system further includes a scanner that is configured to scan the sample in the width direction with the plurality of light sheets and is arranged in a position in which the light emitted from the light source is focused, and a collector lens that is configured to convert the light deflected by the scanner into a collimated beam and is arranged such that the scanner is located in a front focal position of the collector lens.

4. The light sheet illumination microscope according to claim 1, wherein the second optical element is a cylindrical lens array.

5. The light sheet illumination microscope according to claim 1, wherein the illumination optical system further includes a scanner that has a deflection surface that deflects light and is configured to scan the sample in the width direction with the light sheet, and a collector lens which the light deflected by the scanner enters, arranged such that the scanner is located in a front focal position of the collector lens, wherein the second optical element is configured to collect the light emitted from the light source into a line on the deflection surface of the scanner.

6. The light sheet illumination microscope according to claim 5, wherein the second optical element is a cylindrical lens.

7. A light sheet illumination microscope comprising an illumination optical system configured to illuminate a sample from a direction substantially perpendicular to an optical axis of a detection optical system, wherein the illumination optical system includes a first optical element configured to convert light emitted from a light source into a light sheet that forms an illumination area having a sheet shape substantially perpendicular to the optical axis of the detection optical system when the sample is irradiated with the light sheet, and a second optical element that has a plurality of optical element components aligned in a width direction and that acts on the light emitted from the light source such that the light sheet is converged, diverged or diffracted in a width direction of the light sheet.

8. The light sheet illumination microscope according to claim 7, wherein the illumination optical system further includes a scanner that is configured to scan the sample in the width direction with the plurality of light sheets and is arranged in a position in which light emitted from the light source is focused, and a collector lens that is configured to convert the light deflected by the scanner into a collimated beam and is arranged such that the scanner is located in a front focal position of the collector lens.

9. The light sheet illumination microscope according to claim 7, wherein the second optical element is a diffractive optical element or a cylindrical lens array.

* * * * *